Sept. 20, 1938.     H. A. ROSE     2,130,902
CONTROL SYSTEM
Filed Oct. 23, 1935     3 Sheets-Sheet 1

WITNESSES:

INVENTOR
Herbert A. Rose.
BY
ATTORNEY

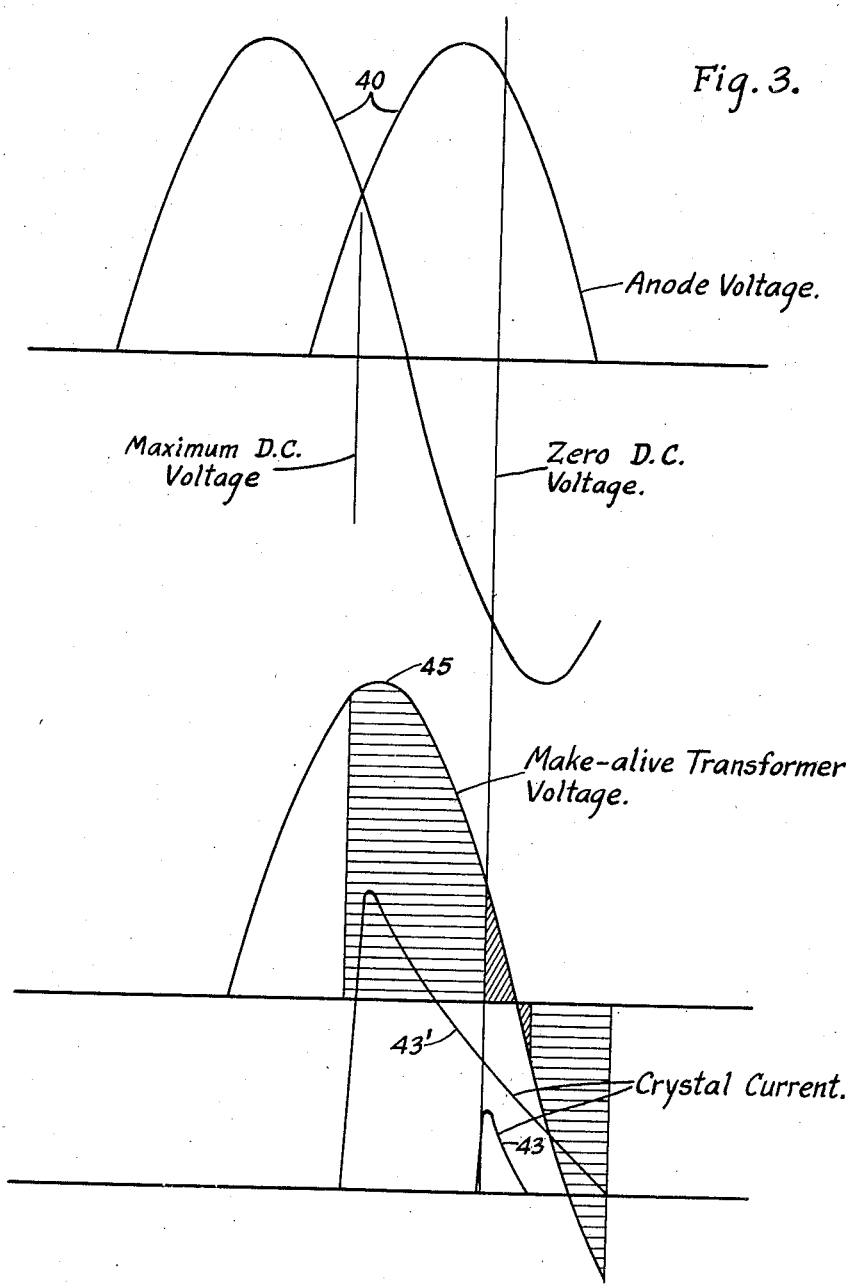

Patented Sept. 20, 1938

2,130,902

UNITED STATES PATENT OFFICE 2,130,902

CONTROL SYSTEM

Herbert A. Rose, Pittsburgh, Pa., assignor to Westinghouse Electric & Manufacturing Company, East Pittsburgh, Pa., a corporation of Pennsylvania Application October 23, 1935, Serial No. 46,382

11 Claims. (Cl. 175—363)

My invention relates to a vapor-electric converter and particularly, to a control system for a converter having make-alive type excitation.

In the application of vapor-electric converters, it is desirable to provide means for controlling the output voltage and current conditions of the converter. In the make-alive type converter, the output voltage is controlled by determining the instant of application of make-alive potential to the make-alive electrodes associated with the individual valves of the converter.

In the converter according to my invention, each of the individual valves of the converter is provided with a suitable make-alive electrode, that is, an electrode of high resistance or semiconducting material, placed in permanent contact with the cathode of a valve and adapted, on passage of suitable current therethrough, to create a cathode spot in the valve. A suitable actuating transformer is provided for supplying make-alive potential to the make-alive electrodes and the current flow from the actuating transformer to the make-alive electrodes is preferably controlled by means of suitable auxiliary valves connected in series with the terminals of the actuating transformer and the make-alive electrodes.

When utilizing make-alive type excitation, it is desirable to reduce, as far as possible, the heating effects of the make-alive current in the make-alive electrodes. Accordingly, I have provided means for adjusting the phase relation of both the actuating transformer and a control potential for the auxiliary control valves, so that current is permitted to flow to the make-alive electrodes only for the necessary interval to create the desired cathode spots. I have found that in the utilization of make-alive electrodes, it is desirable to have the make-alive current rise to a suitable value in a short interval of time, in order to precisely control the instant of formation of the cathode spot. In the preferred embodiment of my invention the control system is so arranged that a substantial portion of the actuating transformer voltage is suddenly applied to the make-alive electrode and the phase relation of the voltage is preferably so chosen as to minimize the duration of the current impulse to the electrode. In general it is desirable to terminate current flow to the make-alive electrodes prior to termination of the conducting period in the main valve. Accordingly, I have provided my actuating transformer with suitable means, such as condensers, connected in parallel with the phase windings of the secondary of the actuating transformer, which neutralizes substantially the reactance drop through the transformer winding at the beginning of current flow to the make-alive electrodes.

For simplicity of illustration I have shown a transformer producing substantially sine wave forms of potential; however, it is obvious that as I desire rapidly rising and decaying current impulses, my transformers may be designed to produce other than sine wave forms such as peaked wave forms.

Other objects and advantages of my invention will be apparent from the following detailed description, taken in conjunction with the accompanying drawings, in which:

Fig. 3 is a diagrammatic illustration of a further method of controlling the instant of ignition of the individual valves of a converter.

Figure 1:
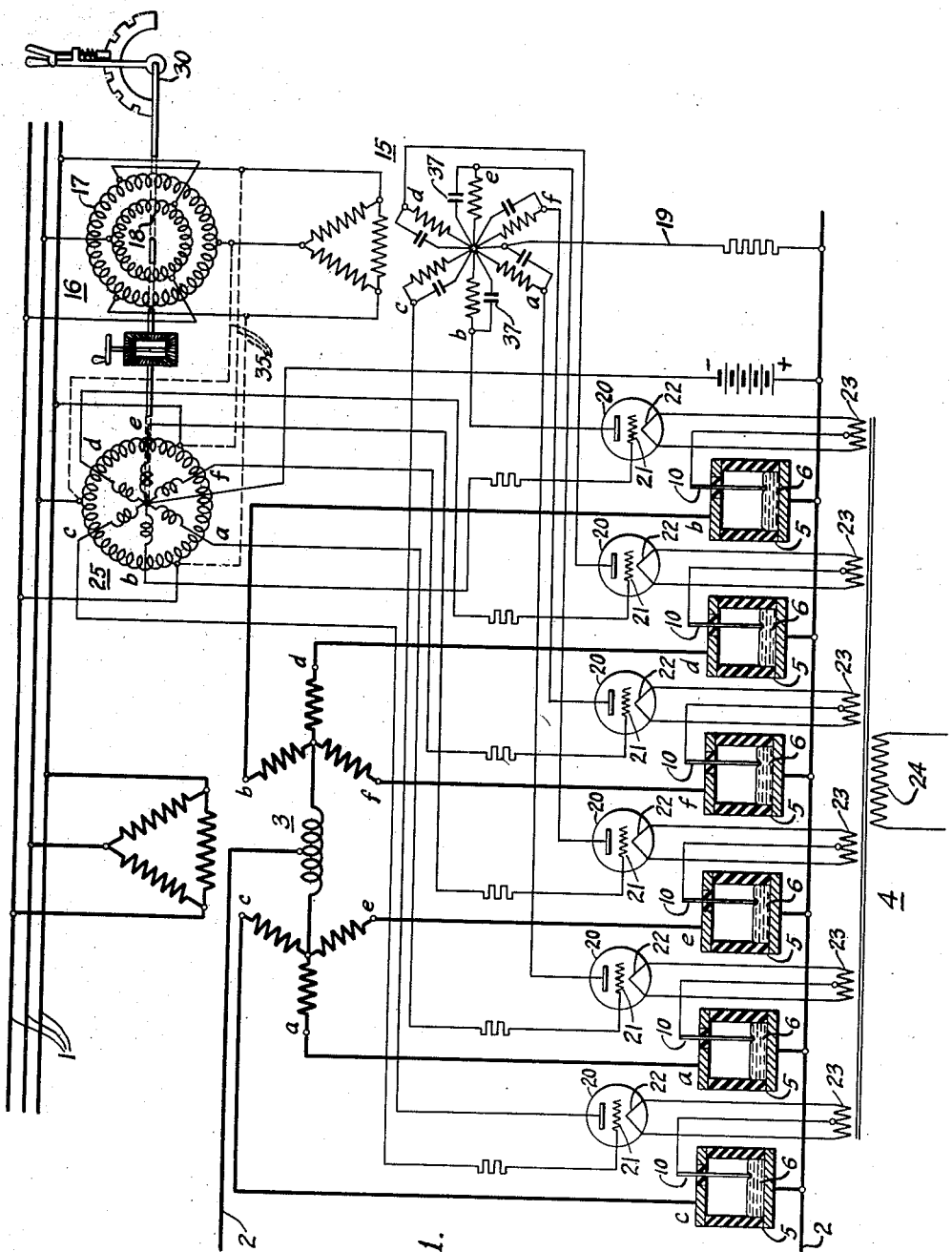
Figure 1 is a schematic illustration of a conversion system embodying my invention.

The illustrative embodiment of my invention as disclosed in Fig. 1 comprises an alternating-current circuit 1 of any suitable phase arrangement, and a direct-current circuit 2, either of which may be the supply circuit or the load circuit, as conditions may require. Alternating and direct-current circuits 1 and 2 are connected by means of a suitable transformer, herein illustrated as a double three-phase transformer 3, and the flow of current between the circuits 1 and 2 is regulated by a converter 4 having make-alive type control for the valves 5 of the converter 4.

The control comprises a make-alive electrode 10 of semi-conducting or high resistance material in contact with the cathode 6 of each valve 5. Each of the make-alive electrodes 10 of a converter 4 is supplied with current by a suitable actuating transformer 15 which is connected to any suitable source of actuating current, such as the alternating-current circuit 1, before referred to.

A suitable phase regulating device 16, preferably of the induction regulator type, having a stationary winding 17 and a rotatable or adjustable winding 18, is connected between the source 1 of actuating potential and the actuating transformer 15, so that the phase relation of the actuating transformer 15 may be adjusted at will, with respect to the phase relation of the source of actuating potential 1, or the phase relation of the potentials applied to the valves 5 of the converter 4.

While many suitable transformer connections may be utilized for the actuating transformer 15, I prefer to utilize a connection which provides at least as many phases as there are operating phases in the main transformer 3.

For purposes of illustration I have shown the main transformer 3 connected for double three phase operation and I have shown the actuating transformer 15 as six-phase diametrical as the most convenient and economical connection for securing the benefits of my invention.

It is desirable to have the make-alive electrodes 10 carry current for relatively short time intervals, usually considerably shorter than the conducting intervals of the associated main valve 5. Several features of my invention are co-ordinated to secure this desired characteristic, first the cathodes 6 of the main valves 5 are connected to the neutral point of the actuating transformer 15 by a relatively low impedance connection 19 so that the several phase windings of the actuating transformer 15 act substantially independently of each other; second, suitable auxiliary valves 20 are provided to prevent inverse current flow in the make-alive electrodes 10 and finally, the auxiliary valves 20 are provided with control electrodes such as grids 21 to further limit the conducting interval to a predetermined portion of the positive impulse of the actuating transformer 15. I have therefore connected between each of the phase terminals of the actuating transformer 15 and the make-alive electrode 10 actuated thereby, a suitable auxiliary valve 20, preferably of the hot-cathode grid-controlled type. Each of the cathodes 22 of the auxiliary valves 20 is provided with an individual heating transformer 23, all of which may, if desired, be combined in a single transformer 24, as indicated in the illustration.

The control grids 21 of the auxiliary valves 20 are provided with control potential from a suitable control transformer 25 which is preferably supplied with potential from the same source as the actuating transformer 15. The control transformer 25 is provided with suitable phase-shift for adjusting the phase relation of the potential applied to the grids 21 of the auxiliary tubes 20 with respect to the output potential of the actuating transformer 15. While any suitable phase-shifting device may be used, I prefer to use an induction phase-shifter having a stationary winding and a rotatable secondary winding. If desired, the rotatable winding and the transformer windings may be combined in a single device 25 as shown, or if desired, the transformer 25 and the phase-shifting devices may be separate, as indicated for the actuating transformer circuits.

The phase relation of the control transformer 25 is preferably adjustable with relation to the phase of the actuating transformer 15, in order to control the intervals of current conduction from the actuating transformer 15 to the make-alive electrodes 10, it is desirable also to have the phase relations of the actuating transformer 15 and the control transformer 25 adjustable by a common means 30, so that after the duration of the conducting interval has been established, the phase relation of the entire control system may be shifted at will with respect to the phase of the potentials supplied to the main valves 5 of the converter 4, in order to control the output voltage or current of the converter 4. This simultaneous adjustment may be secured by providing a common connection 30 for the rotors of the phase adjusting mechanisms of the actuating transformer 15 and of the control transformer 25, or as indicated by the broken line connections 35, the control transformer 25 may be connected in parallel with the actuating transformer 15 so that the phase relation of both may be simultaneously adjusted by the induction regulator device 16.

It is desirable to have the actuating current for the make-alive electrodes 10 rise above the critical current, that is, the current necessary to create the cathode spot, in a relatively short time interval. However, the flow of current through the impedance of the secondary windings of the actuating transformer 15 tends to reduce the terminal voltage of the transformer 15, so that the current to the make-alive electrodes 10 builds up relatively slowly. In order to counteract this reactance characteristic of the actuating transformer 15, I have provided capacitors 37 connected in parallel with the phase windings of the actuating transformer 15 which substantially neutralizes the reactance effect of the windings and permits the actuating current to rise rapidly. For ease in tracing the connections the phase terminals and their associated equipment have been lettered $a$ to $f$.

Figure 2:
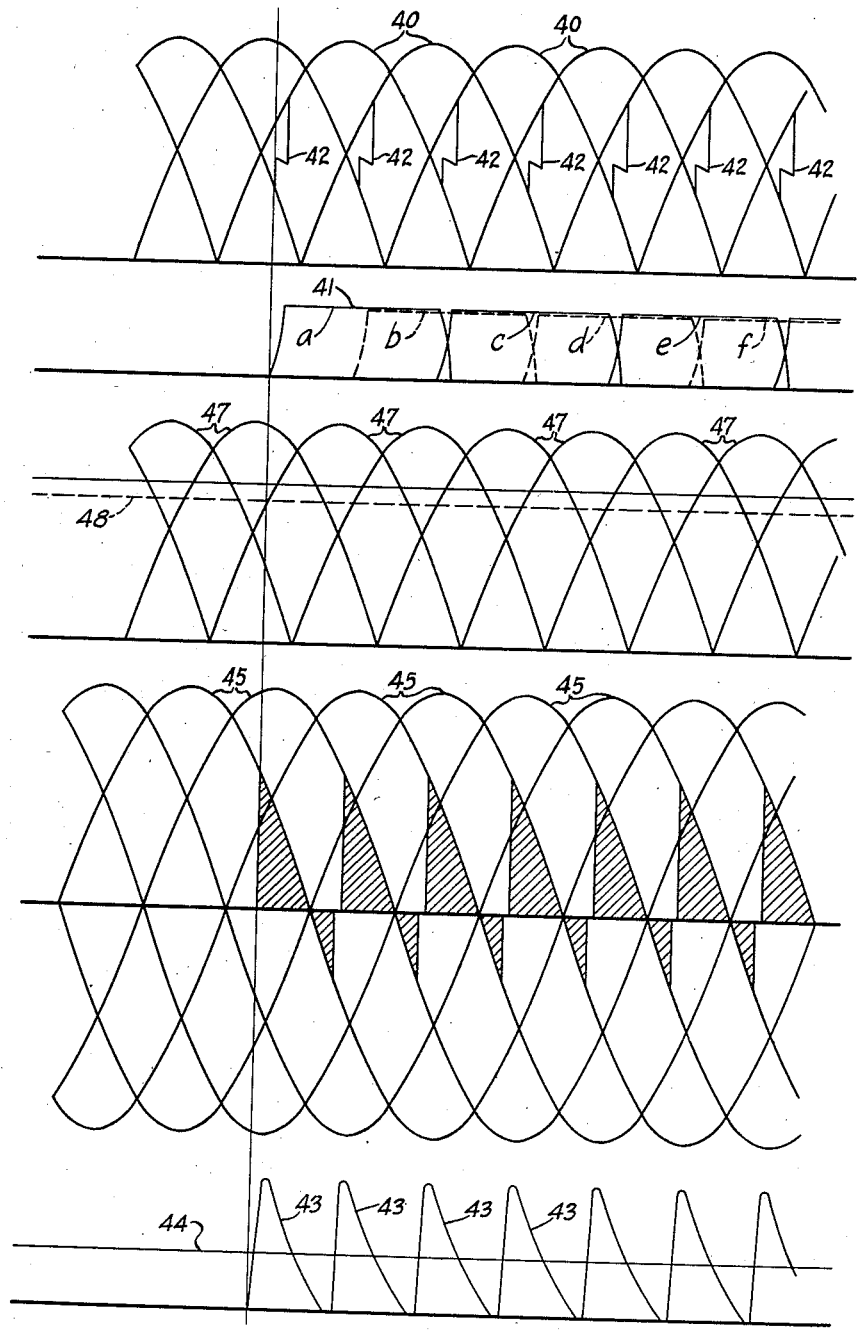
Fig. 2 is a diagrammatic illustration of the current and voltage values in the converter and the attendant control equipment.

The control characteristics of my invention may best be understood with reference to the diagrammatic current and voltage illustrations of Fig. 2, the curve 40 of which shows the potentials applied to the valves 5 of the converter 4. The valve current for each valve of the converter is indicated at 41, and the commutation interval between the valves is indicated at 42. In order to secure the commutation at the desired instant, it is necessary to produce a make-alive current 43 rising above the critical current 44 at the instant commutation is desired. In order to secure this the phase of the potentials 45 of the actuating transformer 15 is shifted to the desired point. Usually the make-alive current 43 is required to flow only for a sufficient interval to create the desired cathode spot. Consequently, the phase relation of the control transformer 25 is adjusted so that after the current 43 starts to flow only a relatively short conducting period will result before the reversal of the terminal potential of the actuating transformer 15. The actual length of the conducting period is determined by the control transformer 25 which has its phase relation shifted with respect to the phase voltages 45 of the actuating transformer 15, so that the control potential 47 will rise above the critical potential 48 of the control or auxiliary valves 20 at the desired time instant.

Obviously, the time of commutation, and consequently, the terminal voltage of the converter 4, may be varied at will by shifting the time of application of the make-alive current 4 to the make-alive electrodes, which may be done by shifting the phase relation of either the actuating transformer 15 or the control transformer 25.

I prefer to adjust the control transformer 25 to determine the time duration of flow of make-alive current 43 and to adjust the terminal voltage of the converter 4 by simultaneous adjustment of the phase relation of both the control and actuating transformers 15 and 25.

At very low currents on the converter 4, a condition of instability may occur so that the load current of the converter may cease to flow prior to the beginning of flow of current in the succeeding valve, that is, before the commutation period normally would occur. This would result in termination of current flow and inactivity of the converter. To prevent such an occurrence at light load, I may adjust the phase relation of the actuating transformer 15 so that positive potential can be applied to the make-alive electrode 10 throughout the conducting period of the converter valve 5 and at the same time shift the phase relation of the control transformer 25 to control the duration of current flow, so that the current 43 flows through the make-alive electrode 10, throughout substantially the entire conducting period of the make-alive valve 5.

As pointed out above the output voltage of the converter 4 may be varied either by shifting the phase relation of the actuating transformer 15 and the control transformer 25 or by shifting the phase relation of the control transformer 25 alone.

In Fig. 3 I have shown a particular application which is sometimes desirable for rapid variation of the terminal voltage of the converter 4. This figure shows only a single commuting point for the anode potential 40 and the actuating transformer 15 is adjusted by the phase shifter 16 so that the make-alive transformer voltage 45 can supply make-alive current from the zero delay point to the maximum delay point, that is, the variation from maximum direct current voltage to zero direct current voltage, as shown on the diagram, the actual duration of flow of make-alive current or crystal current is then controlled by phase shifter 25 and can be any value from that shown by curve 43 to that shown by curve 43'. When zero direct current voltage is required, the phase shifter 25 is adjusted to release grids 21 of auxiliary tubes 20 at the point indicated by the beginning of curve 43 and current will flow in the crystal 10 as indicated by the diagonal hatching under the voltage curve 45, the hatched area denoting the energy supplied to the make-alive electrode. Then, if it is desired to increase the direct current voltage, the phase shifter 25 is adjusted to release grids 21 of auxiliary tubes 20 at an earlier time, the earliest effective time being at maximum direct current potential or zero delay as indicated by the beginning of curve 43'. The crystal current, of course, flows for a much longer period consuming energy as indicated by the horizontal hatching under curve 45.

While for purposes of illustration I have described a specific embodiment of my invention, it will be apparent to those skilled in the art that many changes and modifications can be made therein without departing from the true spirit of my invention or the scope of the appended claims.

I claim as my invention:

1. An electrical conversion system comprising a polyphase alternating-current circuit, a direct-current circuit, a converter having a plurality of make-alive type valves for transferring energy between said circuits, a make-alive electrode for each of said valves, a source of actuating potential, an actuating transformer for supplying current from said source to said electrodes, control valves connected in series with said make-alive electrodes and said actuating transformer, control electrodes in each of said control valves, a control transformer for supplying potential to said control electrodes, means for adjusting the phase of the control potential and means for adjusting the phase relation of the actuating transformer potentials.

2. An electrical conversion system comprising a polyphase alternating-current circuit, a direct-current circuit, a converter having a plurality of make-alive type valves for transferring energy between said circuits, a make-alive electrode for each of said valves, a source of actuating potential, an actuating transformer for supplying current from said source to said electrodes, control valves connected in circuit with said make-alive electrodes and said actuating transformer, control electrodes in each of said control valves, a control transformer for supplying potential to said control electrodes, means for simultaneously adjusting the phase relation of the actuating transformer and the control transformer, and means for independently adjusting the phase angle of the control transformer for controlling the starting time and the duration of current flow to the make-alive electrode.

3. An electric conversion system comprising an electric current supply circuit, an electric current load circuit, a plurality of make-alive type valves for transferring energy between said circuits, a make-alive electrode in each of said valves, a source of operating current for said make-alive electrodes, means for shifting the phase-relation of the operating current supplied to the make-alive electrodes, an auxiliary valve in series with each of said make-alive electrodes and control electrodes for determining the conducting period of said auxiliary valves.

4. A converter system comprising a plurality of make-alive type valves, a make-alive electrode in each of said valves, an actuating transformer for supplying current to said make-alive electrodes, a source of actuating current for said transformer, an induction phase shifter connected between said source and said transformer, connections from said actuating transformer to said make-alive electrodes, a grid controlled auxiliary valve in each of said connections, a grid supply transformer for supplying control potential to the grids of said auxiliary valves, phase-shifting means associated with said grid supply transformer, and means for adjusting the phase relation of the grid supply transformer with respect to the phase relation of the actuating transformer whereby the duration of current flow from said actuating transformer to said electrodes is regulated.

5. A converter system comprising a plurality of make-alive type valves, a make-alive electrode in each of said valves, an actuating transformer for supplying current to said make-alive electrodes, a source of actuating current for said transformer, an induction phase shifter connected between said source and said transformer, connections from said actuating transformer to said make-alive electrodes, a grid controlled auxiliary valve in each of said connections, a grid supply transformer for supplying control potential to the grids of said auxiliary valves, phase-shifting means associated with said grid supply transformer, means for adjusting the phase relation of the grid supply transformer with respect to the phase relation of the actuating transformer whereby the duration of current flow from said actuating transformer to said electrodes is regulated, and means for simultaneous adjustment of the phase relation of both said actuating transformer and said grid control transformer.

6. An electrical conversion system comprising a three-phase alternating-current circuit, a direct-current circuit, a make-alive converter for transferring energy between said circuits, a double three-phase transformer for connecting said circuits to said converter, a make-alive electrode for each valve of said converter, an actuating transformer for supplying current to said make-alive electrodes, the secondary of said actuating transformer being connected for six phase operation, a source of three-phase potential connected to said actuating transformer, a rotary phase changer connected between said source and said actuating transformer, auxiliary valves connected between actuating transformer and said make-alive electrodes, a low impedance connection between the neutral point of said actuating transformer and the cathode of said converter, control electrodes for said auxiliary valves, a control transformer for controlling said auxiliary valves, means for adjusting the phase relation of the control transformer relative to the phase relation of the actuating transformer for determining the interval of application of actuating current to the make-alive electrodes, and means for operating the phase changer for determining the time of application of current to the make-alive electrodes.

7. An electric conversion system comprising an electric supply circuit, an electric load circuit, a make-alive valve system for transferring energy between said systems, a transformer for connecting said circuits to said valves, a make-alive electrode for each of the valves of said valve system, a source of actuating potential for said make-alive electrodes, an actuating transformer for supplying current from said source to said make-alive electrodes, auxiliary controlled valves for controlling the flow of current from said actuating transformer to said electrodes, means for shifting the phase relation of the output voltage of said actuating transformer, and means for controlling said auxiliary valves to determine the time of current application to said make-alive electrodes.

8. An electric conversion system comprising an electric supply circuit, an electric load circuit, a make-alive valve system for transferring energy between said systems, a transformer for connecting said circuits to said valves, a make-alive electrode for each of the valves of said valve system, a source of actuating potential for said make-alive electrodes, an actuating transformer for supplying current from said source to said make-alive electrodes, auxiliary controlled valves for controlling the flow of current from said actuating transformer to said electrodes, means for shifting the phase relation of the output voltage of said actuating transformer, means for controlling said auxiliary valves to determine the time of current application to said make-alive electrodes, and means associated with said actuating transformer for neutralizing the initial reactive drop upon commencement of current flow to said make-alive electrodes.

9. An electrical conversion system comprising an alternating-current supply circuit, a direct-current load circuit, a plurality of make-alive type valves for transferring energy between said circuits, a make-alive electrode in each of said valves, a source of alternating actuating current for said make-alive electrodes, a phase changer for controlling the phase relation of the current derived from said source, a control transformer energized from said source, said transformer having terminals connected to said make-alive electrodes, current control means connected in series with each of said make-alive electrodes, and a control device for controlling said current control means.

10. An electrical conversion system for transferring energy between a direct-current and an alternating-current circuit comprising a converter having a plurality of make-alive type valves, a transformer device for connecting said valves to said circuits, a make-alive electrode in each valve of said converter, a source of actuating current for said electrodes, an actuating transformer interposed between said source and said electrodes, a phase shifting device for said actuating transformer, controlled auxiliary valves for determining the flow of current from said actuating transformer to said electrodes, a control transformer for supplying control potential to said auxiliary valves, and phase shifting means associated with said control transformer.

11. An electrical conversion system for transferring energy between a direct-current and an alternating-current circuit comprising a converter having a plurality of make-alive type valves, a transformer device for connecting said valves to said circuits, a make-alive electrode in each valve of said converter, a source of actuating current for said electrodes, an actuating transformer interposed between said source and said electrodes, a phase shifting device for said actuating transformer, controlled auxiliary valves for determining the flow of current from said actuating transformer to said electrodes, a control transformer for supplying control potential to said auxiliary valves, phase shifting means associated with said control transformer, and means associated with said actuating transformer for maintaining the terminal voltage on commencement of current flow to said make-alive electrodes.

HERBERT A. ROSE.